United States Patent

[11] 3,596,395

[72] Inventors Dee S. Clement
245 East 100 North, Santaquin, Utah 84655;
Warren Alfred Ross, Ajo, Ariz.
[21] Appl. No. 815,148
[22] Filed Apr. 10, 1969
[45] Patented Aug. 3, 1971
[73] Assignee said Clement, by said Ross

[54] REMOTE-CONTROLLED TRAP FOR SMALL GAME
9 Claims, 3 Drawing Figs.

[52] U.S. Cl. ........................................................ 43/63
[51] Int. Cl. ........................................................ A01m 23/32
[50] Field of Search .................................... 43/62, 63,
83.5, 95, 110, 111, 83, 81.5, 82, 92

[56] References Cited
UNITED STATES PATENTS
433,241 7/1890 Hawkins, Jr. .................. 43/63
665,907 1/1901 Hooker ........................ 43/83

*Primary Examiner* — Warner H. Camp
*Attorney* — Larson, Taylor & Hinds

ABSTRACT: A trap for small game is provided wherein movement of a hinged bow between a first, cocked position and a second, sprung position is controlled by a radio receiver arrangement responsive to a remote radio signal provided by the trapper. The receiver arrangement controls a triggering device including a pivotable trigger release member and a curved, generally upright springlike "striker" member which cooperate to retain the hinged bow therebetween. Pivoting of the trigger release member responsive to the radio receiver arrangement provides release of the hinged bow member and thus springing of the trap.

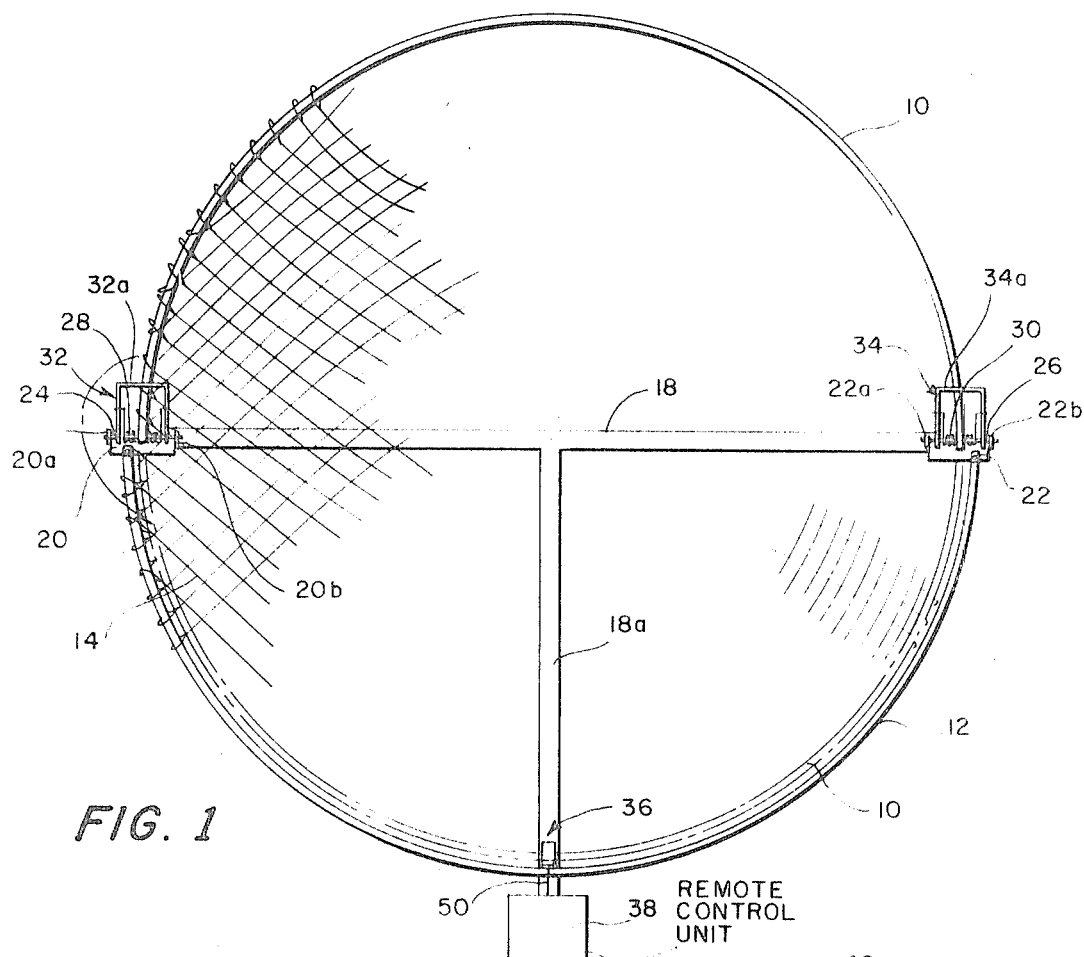

3,596,395

1

REMOTE-CONTROLLED TRAP FOR SMALL GAME

BACKGROUND OF THE INVENTION

1. Field of the Invention

The present invention relates to a trap for small game such as birds and more particularly to a remotely operable, radio-triggered trap.

2. The Prior Art

During the years traps for small game such as birds have taken a variety of forms. Although many of these traps have been more or less successful in use for general trapping purposes, it is desired in many instances that a trapper have control over triggering of the trap. Among the advantages provided by such an approach is that the creature to be trapped can generally be captured without injury. In general, traps which permit such control by the trapper have suffered a number of disadvantages. For example, in one prior approach a trap is triggered by a concealed hunter who pulls on a string to spring the trap. It will be appreciated that the effectiveness of such an approach is necessarily limited because of the required closeness of the trapper to the trap as well as because of the general crudeness of the triggering arrangement. In this regard it is noted that the provision of a suitable triggering mechanism presents a number of problems and that it is in this area that many prior art traps suffer their most serious shortcomings.

SUMMARY OF THE INVENTION

In accordance with the invention an improved trap is provided wherein triggering of the trap may be effected by an operator removed a substantial distance from the site of the trap.

Pursuant to an important feature of the invention, a unique triggering arrangement is provided whereby the trap is readily and easily set up and operated.

In accordance with a presently preferred embodiment of the invention the trap is formed by a fixed bow member, a pivotable bow member and netting or the like secured to the two members, the pivotable bow member being biased towards the operative or sprung position thereof. The pivotable bow member is held in the inoperative or cocked position thereof against these biasing forces by a triggering arrangement including a radio control unit. The radio control unit can be operated from a remote transmitter to provide release of the pivotable bow member and, consequently, springing of the trap.

The triggering arrangement includes a movable trigger release member which cooperates with an inwardly curved member, referred to as a striker plate, to capture and hold the pivotable bow member therebetween. The trigger release member and striker plate are disposed and arranged such that the biasing forces on the pivotable bow member cause this member to bear against the striker plate and to attempt to ride up the inwardly curved surface thereof to a point where the bow member is released. However, the trigger release member in the holding or locking position thereof also engages the pivotable bow member and serves to limit its movement so as to prevent release thereof. The trigger release member and the striker plate are shaped and arranged such that the bow member will tend to wedge itself therebetween, the biasing forces on the bow member acting to cause pivoting of the trigger release member in a direction such as to strengthen the holding forces on the bow member.

Other features and advantages of the invention will be set forth in or apparent from the detailed description of a preferred embodiment found hereinbelow.

BRIEF DESCRIPTION OF THE DRAWINGS

FIG. 1 is a top view of a trap arrangement constructed in accordance with a presently preferred embodiment of the invention, FIG. 1 showing the trap in the sprung position thereof in solid lines and in the cocked position thereof in phantom lines;

2

FIG. 2 is a fragmentary side elevational view to an enlarged scale of the trigger mechanism of FIG. 1; and FIG. 3 is an exploded perspective view to an enlarged scale of the trigger mechanism of FIG. 2.

DESCRIPTION OF A PREFERRED EMBODIMENT

Referring to FIG. 1, a top view of a presently preferred embodiment of the trap of the invention is shown with the trap in the "sprung" position or state thereof. The trap includes first and second generally bow-shaped members 10 and 12, bow member 10 being hinged or pivoted to enable movement thereof between an operative or sprung position shown in solid lines and an inoperative or cocked position shown in dashed lines. A section of netting 14 is attached at the edges thereof along bow members 10 and 12 to form the trap.

A T-frame 18 is positioned with the outwardly extending arms thereof between the free ends of stationary bow member 12 and with the central leg, denoted 18a, forming a bisecting radius for bow member 12 as shown in FIG. 1. Stationary bow member 12 is affixed at the free ends thereof to first and second base plates 20 and 22 mounted on the ends of the opposite arms of T-frame 18. Base plates 20 and 22 respectively include upright flanges 20a, 20b and 22a, 22b between which first and second pivot shafts 24 and 26 are respectively supported. Shafts 24 and 26 extend through openings in the respective free ends of pivotable bow member 10. Shafts 24 and 26 also respectively support biasing springs 28 and 30 as shown. Springs 28 and 30 each include end portions which bear against the leg portions of U-shaped pivot members 32 and 34, respectively. Pivot members 32 and 34 are pivoted about shafts 24 and 26 and respective central portion thereof, denoted 32a and 34a, engage and bear against end portions of bow member 10. Hence, spring members 28 and 30 provide biasing forces which are transmitted through pivot members 32 and 34 and which bias pivotable bow member 10 into the sprung position shown in solid lines in FIG. 1.

Control of the release or springing of the trap, through the release of hinged bow member 10, is effected through a trigger arrangement generally denoted 36. Actuation of trigger arrangement 36 is in turn controlled by a remote control unit 38 described hereinbelow.

Referring to FIGS. 2 and 3, the trigger arrangement 36 includes a trigger release member 40 which is pivoted between upright flanges 42a and 42b of a unitary support member or mount 42 by suitable means such as the shaft provided by a pin 44. Trigger release member 40 includes first and second flat, opposed side faces 40a and 40b of generally triangular form as viewed from the side. Faces 40a and 40b are bound by perpendicular edge surfaces 40c, 40d and 40e, one upper edge surface 40c being generally flat and the lower edge surface 40d and the other upper edge surface 40e being of concave curvature as shown. Pin 44 extends through an opening 40f, between opposed faces 40a, 40b, located in an upper portion of trigger release member 40 and thus the center of gravity of member 40 lies well below the axis of support.

A striker plate 46 is formed by an upright flange bent out of and integral with trigger mount 42. Striker plate 46 is curved in cross section and is is best seen in FIG. 2 includes a lower generally U-shaped portion 46a. Striker plate 46 further includes a slightly curved end portion 46b which is adapted to engage hinged bow member 10 as shown.

Trigger mount 42 further includes a base portion 42c which is secured to an end portion of the central leg 18a of T-frame 18 by suitable means such as screws 48. Base portion 42c includes a curved, generally U-shaped portion 42d which forms an opening in which stationary bow member 12 is received and which thus serves to secure bow member 12 to frame 18.

It will be appreciated from the foregoing description that trigger release member 40, because of the position of the center of gravity relative to the axis of rotation formed by pin 44, will normally assume the position shown in FIG. 2, that is, the locking or holding position thereof. Thus, as hinged bow member 10, under the biasing forces exerted by springs 28 and 30, attempts to ride up the inwardly curved surface 46a of striker plate 46 bow member 10 will engage the lower curved surface 40d of trigger release member 40. Thus trigger release member 40 and striker plate 46 cooperate to limit the movement of bow member 10 and hence to "lock" bow member 10 against release member 40. It is noted that the movement of bow member 10 caused by the biasing forces thereon will tend to cause pivoting of trigger release member 40 in a counterclockwise direction as shown in FIG. 2 and thus will cause bow member 10 to wedge itself even more securely between trigger release member 40 and striker plate 46.

An eyelet member 48 is secured in a lower portion of the flat edge surface 40c of trigger release member 40, eyelet member 48 serving to connect member 40 to an actuating cable 50. It will be appreciated that a pulling force on cable 50 to the left as shown in FIG. 2 will cause a clockwise pivoting of trigger release member 40 out of engagement with bow member 10 and, as bow member 10 rides by the end portion of edge surface 40d, release of bow member 10 and triggering of the trap. The triggering force for actuating cable 50 is supplied by remote control unit 38 referred to hereinabove.

The remote control unit 38 may take a number of forms, the function of the unit 38 being simply to provide a pulling or releasing force on cable 50 in response to a remote radio signal. For example, unit 38 may be constructed in accordance with the general teachings of U.S. Pat. No. 2,867,394 and thus may comprise a radio receiver control solenoid which closes a relay in response to a remote signal. Closing of the relay completes a motor circuit which controls rotation of a disc connected to release cable 50. Rotation of this disc produces a pulling force on cable 50 and consequently causes triggering of the trap as described hereinabove. The remote control unit 38 may further include a removable antenna for picking up signals transmitted by a transmitter (not shown) carried by the operator.

The general operation of the trap of the present invention should be obvious from the foregoing description. The operator conceals himself at a position relative to the trap site in such a manner that he has a clear view of the trap. When a bird or the like approaches the trap the operator can, at the appropriate moment, through a signal transmitted by him to radio receiver control unit 38, cause springing or triggering of the trap in the manner described hereinabove. To review this operation briefly a signal from the transmitter will cause a releasing movement of cable 50 and a consequent pivoting of trigger release member 40 to permit release of hinged bow member 10. Release of bow member effects trapping of the prey within the netting secured to stationary bow member 12 and hinged bow member 10.

Although the invention has been described in detail with reference to a presently preferred embodiment thereof it will be understood that variations and modifications of the exemplary embodiment described hereinabove can be effected without departing from the scope and spirit of the invention.

We claim:

1. A trap arrangement comprising a fixed member, a pivotable member movable between a first, cocked position and a second, sprung position, netting secured to said fixed member and to said pivotable member for forming a trap when said pivotable member is in the sprung position thereof, biasing means for biasing said pivotable member into the sprung position thereof, triggering means for holding said pivotable member in the cocked position thereof against the biasing force of said biasing means, and electrical, remotely controlled means for controlling the release of said triggering means and thus movement of said pivotable member to the sprung position thereof.

2. A trap arrangement as claimed in claim 1 wherein said fixed member comprises a generally bow-shaped member and wherein said pivotable member comprises a generally bow-shaped member, said pivotable bow-shaped member lying adjacent said fixed bow-shaped member in the cocked position thereof.

3. A trap arrangement as claimed in claim 2 further comprising a fixed T-frame positioned with the arms thereof lying between the free ends of said fixed bow-shaped member, the central leg of said T-frame supporting said triggering means.

4. A trap arrangement as claimed in claim 1 wherein said remotely controlled means comprises radio receiver means responsive to a remote radio transmitter and means responsive to said receiver means for causing release of said triggering means.

5. A trap arrangement as claimed in claim 4 wherein said triggering means comprises means comprising a movable trigger release member and a further member for cooperating to retain said pivotable member in the cocked position thereof, said movable trigger release member being pivotable between a first, normal position wherein said pivotable member is held against movement and a second, release position wherein said pivotable member is released and the trap is sprung.

6. A trap arrangement as claimed in claim 5 wherein the center of gravity of said release member is such that said member normally assumes the first position thereof and said further member comprises a generally upright member including a inwardly curved surface for engaging said pivotable member.

7. A trap arrangement as claimed in claim 6 further comprising first and second spaced flange members for pivotably supporting said trigger release member and formed integrally with said spring member.

8. A trap arrangement as claimed in claim 7 wherein the integral combination of said first and second flange members and said spring member further comprises a curved portion for serving in fixing the position of said fixed member.

9. A trap arrangement comprising trap means movable between a first, cocked position and a second, sprung position and triggering means for holding said trap means in the cocked position thereof and for controlling the release of said trap means to permit movement thereof to the sprung position thereof, said triggering means comprising a pivotable trigger release member and a fixed striker member cooperating to hold said trap means in the cocked position thereof, said pivotable trigger release member being movable between a first, normal position wherein said trap means is held against movement and a second, release position wherein said trap member is released and the trap is sprung, and trapper-controlled means for controlling movement of said pivotable trigger release member to the release position thereof, said trap means including a pivotable bow-shaped member, and the center of gravity of said trigger release member being such that said trigger release member normally assumes said first position thereof, said striker member comprising a generally upright member including an inwardly curved surface for engaging said pivotable bow member.